(12) United States Patent
Jacquel et al.

(10) Patent No.: US 11,859,046 B2
(45) Date of Patent: Jan. 2, 2024

(54) HIGH-VISCOSITY POLYESTER WITH IMPROVED IMPACT PROPERTIES

(71) Applicant: Roquette Freres, Lestrem (FR)

(72) Inventors: Nicolas Jacquel, Lambersart (FR); René Saint-Loup, Lomme (FR); Jean-Pierre Pascault, Villeurbanne (FR); Françoise Fenouillot, L'Isle d'abeau (FR); Alain Rousseau, Saint-Priest (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 15/576,205

(22) PCT Filed: May 20, 2016

(86) PCT No.: PCT/FR2016/051208
§ 371 (c)(1),
(2) Date: Nov. 21, 2017

(87) PCT Pub. No.: WO2016/189239
PCT Pub. Date: Dec. 1, 2016

(65) Prior Publication Data
US 2018/0155493 A1    Jun. 7, 2018

(30) Foreign Application Priority Data

May 22, 2015 (FR) ...................................... 1554597

(51) Int. Cl.
*C08G 63/80* (2006.01)
*C08G 63/672* (2006.01)
*C08G 63/78* (2006.01)
*C08G 63/183* (2006.01)
*C08G 63/91* (2006.01)

(52) U.S. Cl.
CPC ........... *C08G 63/80* (2013.01); *C08G 63/183* (2013.01); *C08G 63/672* (2013.01); *C08G 63/78* (2013.01); *C08G 63/916* (2013.01)

(58) Field of Classification Search
CPC ...... C08G 63/00; C08G 63/672; C08G 63/78; C08G 63/80
See application file for complete search history.

(56) References Cited

U.S. PATENT DOCUMENTS

| | | | | |
|---|---|---|---|---|
| 6,063,464 | A * | 5/2000 | Charbonneau | C08G 63/668 |
| | | | | 428/35.7 |
| 6,359,070 | B1 * | 3/2002 | Khanarian | C08L 67/025 |
| | | | | 525/165 |
| 6,376,624 | B1 * | 4/2002 | Kao | C08G 63/916 |
| | | | | 525/438 |
| 6,699,545 | B2 | 3/2004 | Parthasarathy | |
| 2003/0149226 | A1 * | 8/2003 | Conrad | C08G 63/85 |
| | | | | 528/283 |
| 2004/0092703 | A1 | 5/2004 | Germroth et al. | |
| 2006/0173154 | A1 | 8/2006 | Charbonneau | |
| 2007/0248825 | A1 * | 10/2007 | Bolks | C09D 7/80 |
| | | | | 524/904 |
| 2009/0186973 | A1 * | 7/2009 | Molhoek | C09D 169/00 |
| | | | | 252/182.13 |
| 2009/0252879 | A1 * | 10/2009 | Yukawa | C09D 133/066 |
| | | | | 427/372.2 |
| 2011/0040004 | A1 * | 2/2011 | Andjelkovic | C08L 67/06 |
| | | | | 524/394 |
| 2011/0282020 | A1 | 11/2011 | Sipos | |
| 2012/0177854 | A1 * | 7/2012 | Lee | C08G 63/672 |
| | | | | 428/35.7 |

FOREIGN PATENT DOCUMENTS

| | | |
|---|---|---|
| EP | 1 882 712 B1 | 4/2010 |
| EP | 2 857 433 A1 | 4/2015 |
| JP | 2013-237171 A | 11/2013 |
| TW | 281928 B | 6/2007 |
| WO | WO 99/54119 A1 | 10/1999 |
| WO | WO 2010/010282 A1 | 1/2010 |
| WO | WO 2011/031112 A2 | 3/2011 |
| WO | WO 2013/062408 A1 | 5/2013 |
| WO | WO-2014100257 A2 * | 6/2014 ......... B29C 47/0021 |

OTHER PUBLICATIONS

Yoon, Won Jae, et al., "Synthesis and Characteristics of a Biobased High-Tg Terpolyester of Isosorbide, Ethylene Glycol, and 1,4-Cyclohexane Dimethanol: Effect of Ethylene Glycol as a Chain Linker on Polymerization", Macromolecules, 46, p. 7219-7231 (2013).

Xanthos, "Reactive Extrusion: Principles and Practice", Chemical Industry Press, 1st edition, p. 178-183 (Jul. 31, 1999).

Fenouillot et al., "Polymers from renewable 1,4:3,6-dianhydrohexitols (isosorbide, isomannide and isoidide): A review", Progress in Polymer Science, vol. 35, p. 578-622 (2010).

* cited by examiner

*Primary Examiner* — Christopher M Rodd
(74) *Attorney, Agent, or Firm* — Oliff PLC

(57) ABSTRACT

The invention relates to a thermoplastic polymer comprising at least one 1,4:3,6-dianhydrohexitol unit (A), at least one alicyclic diol unit (B) other than the 1,4:3,6-dianhydrohexitol units (A) and at least one high-viscosity terephthalic acid unit (C).

13 Claims, No Drawings

HIGH-VISCOSITY POLYESTER WITH IMPROVED IMPACT PROPERTIES

CROSS REFERENCE TO RELATED APPLICATIONS

This application is a U.S. national stage application of International patent application No. PCT/FR2016/051208, filed May 20, 2016, which claims the priority of French application No. 1554597, filed May 22, 2015, the subject matter of each incorporated in their entirety by reference herein.

FIELD OF THE INVENTION

The present invention relates to a high-viscosity thermoplastic polyester comprising at least one 1,4:3,6-dianhydrohexitol unit, which may have excellent impact strength properties and low coloration. Another subject of the invention is a process for producing said polyester and the use of this polyester for producing various articles.

TECHNOLOGICAL BACKGROUND OF THE INVENTION

Because of their numerous advantages, plastics have become indispensable in the mass production of objects. Indeed, their thermoplastic character enables these materials to be transformed at a high rate into all kinds of objects.

Certain thermoplastic aromatic polyesters have thermal properties which allow them to be used directly for the manufacture of materials. They comprise aliphatic diol and aromatic diacid units. Among these aromatic polyesters, mention may be made of polyethylene terephthalate (PET), which is a polyester comprising ethylene glycol and terephthalic acid units, used for example in the manufacture of containers, packaging, films or else fibers.

According to the invention, the term "monomer units" means units, included in the polyester, which may be obtained after polymerization of a monomer. With regard to the ethylene glycol and terephthalic acid units included in PET, they can be obtained either by esterification reaction of ethylene glycol and terephthalic acid, or by transesterification reaction of ethylene glycol and terephthalic acid ester.

However, for certain applications or under certain usage conditions, these polyesters do not have all the required properties, especially optical, impact strength or else heat resistance properties. This is why glycol-modified PETs (PETgs) have been developed. They are generally polyesters comprising, in addition to the ethylene glycol and terephthalic acid units, cyclohexanedimethanol (CHDM) units. The introduction of this diol into the PET enables it to adapt the properties to the intended application, for example to improve its impact strength or its optical properties, especially when the PETg is amorphous.

Other modified PETs have also been developed by introducing, into the polyester, 1,4:3,6-dianhydrohexitol units, especially isosorbide (PEIT). These modified polyesters have higher glass transition temperatures than the unmodified PETs or PETgs comprising CHDM. In addition, 1,4:3,6-dianhydrohexitols have the advantage of being able to be obtained from renewable resources such as starch. These modified polyesters are especially useful for manufacturing bottles, films, thick sheets, fibers or articles requiring high optical properties.

However, one problem encountered in the production of polyesters comprising 1,4:3,6-dianhydrohexitol units, and especially isosorbide units, is that these polyesters generally have a coloration. This coloration has been hitherto explained by the sensitivity of the isosorbide to thermal oxidation at high temperature. In this regard, reference may be made to the review by Fenouillot et al., *Prog Polym. Sci.*, 2010, vol 35, page 578 et seq. which states: "the sensitivity of isosorbide to thermooxidation at high temperature needed to polymerize polyesters is the cause for this yellowing". This very high sensitivity of the isosorbide necessitates, in order to obtain polymers with low coloration, working in an atmosphere essentially free of dioxygen, with a generally limited amount of isosorbide and at a lower temperature.

In order to deal with this problem, document US2006/0173154 A1 teaches a process which makes it possible to reduce this phenomenon of coloration of the polyesters linked to the presence of isosorbide in the starting monomers. This document teaches more particularly a process for producing poly(ethylene-co-isosorbide)terephthalate comprising a step of esterification and a step of polymerization using a polycondensation catalyst and a secondary antioxidant in determined proportions. In addition, it is essential that, during this process, the esterification temperature ranges from 180 to 265° C. and that the polycondensation temperature ranges from 260 to 275° C.

An additional problem with polyesters predominantly comprising ethylene glycol and isosorbide is that they may be difficult to dry. This means that, during the transformation of the polyester to the molten state, moisture may cause hydrolysis of said polyester. Thus, obtaining polyesters which are easier to dry may make it possible to improve the stability of the polyester during its transformation in the molten state.

Another problem with these PEITs is that they may have insufficient impact strength properties. In addition, the glass transition temperature may be insufficient for certain applications.

In order to improve the impact strength properties of the polyesters, it is known from the prior art to use polyesters in which the crystallinity has been reduced. As regards isosorbide-based polyesters, mention may be made of application US2012/0177854, which describes polyesters comprising terephthalic acid units and diol units comprising from 1 to 60 mol % of isosorbide and from 5 to 99% of 1,4-cyclohexanedimethanol which have improved impact strength properties. As indicated in the introductory section of this application, the aim is to obtain polymers in which the crystallinity is eliminated by the addition of comonomers, and hence in this case by the addition of 1,4-cyclohexanedimethanol. In the examples part, the manufacture of various poly(ethylene-co-1,4-cyclohexanedimethylene-co-isosorbide)terephthalates (PECITs), and also an example of poly(1,4-cyclohexanedimethylene-co-isosorbide)terephthalate (PCIT), are described.

However, the Applicant was able to observe (see examples below) that the PCIT synthesized in this application US2012/0177854 has a reduced viscosity in solution which may be insufficient, for example, for the manufacture of films when they are produced by film blowing or else for the manufacture of hollow bodies or threads. Moreover, although its impact strength is presented as improved, this is not the case at all for its cold impact strength. Also, its glass transition temperature may be insufficient for certain applications (for example for hot-filling). On the contrary, the PECITs described in this document exhibit much higher glass transition temperatures. It should be noted that this document also mentions the phenomenon of coloration of the polyester linked to the presence of isosorbide in the starting monomers.

It may also be noted that while polymers of PECIT type have been the subject of commercial developments, this is not the case for PCITs. Indeed, their production was hitherto considered to be complex, since isosorbide has low reactivity as a secondary diol. Yoon et al. (*Synthesis and Characteristics of a Biobased High-Tg Terpolyester of Isosorbide, Ethylene Glycol, and 1,4-Cyclohexane Dimethanol: Effect of Ethylene Glycol as a Chain Linker on Polymerization, Macromolecules*, 2013, 46, 7219-7231) thus showed that the synthesis of PCIT is much more difficult to achieve than that of PECIT. This paper describes the study of the influence of the ethylene glycol content on the PECIT production kinetics.

In Yoon et al., an amorphous PCIT (which comprises approximately 29% isosorbide and 71% CHDM, relative to the sum of the diols) is produced to compare its synthesis and its properties with those of PECIT-type polymers. The use of high temperatures during the synthesis induces thermal degradation of the polymer formed if reference is made to the first paragraph of the Synthesis section on page 7222, this degradation especially being linked to the presence of aliphatic cyclic diols such as isosorbide. Therefore, Yoon et al. used a process in which the polycondensation temperature is limited to 270° C. Yoon et al. observed that, even increasing the polymerization time, the process also does not make it possible to obtain a polyester having a sufficient viscosity. Thus, without addition of ethylene glycol, the viscosity of the polyester remains limited, despite the use of prolonged synthesis times. It should also be noted that, in Yoon et al., the PCIT obtained is presented as an amorphous polyester.

To this day there remains a need to find novel thermoplastic polyesters having a sufficiently high viscosity to be used in more numerous applications. There is also a need to obtain polymers which also have low coloration and/or good impact strength properties, especially in cold conditions.

In the current state of knowledge, it has hitherto not been possible to obtain a high-viscosity polyester comprising 1,4:3,6-dianhydrohexitol units (A), alicyclic diol units (B) other than (A) and terephthalic acid units (C), when this polyester comprises a low molar amount of aliphatic non-cyclic diol units such as ethylene glycol. These aliphatic linear diols are recognized as necessary in the polycondensation reaction to obtain high-viscosity polymers.

There is also a preconception about the necessity of using limited temperatures during processes for producing polyesters comprising 1,4:3,6-dianhydrohexitol units (A) in order to obtain a low degradation of the polymer, and therefore a low coloration. To obtain these polymers, it was necessary to use particular processes using low esterification and polycondensation temperatures because of the high sensitivity of the isosorbide to thermal oxidation.

While conducting studies on the processes for producing polyesters containing 1,4:3,6-dianhydrohexitol units, the Applicant has succeeded in obtaining a novel high-viscosity polyester, this polyester possibly also having excellent impact strength properties, low coloration and/or an ability to be dried easily. This polyester may be used under very different temperature conditions since it has excellent cold impact strength while having a high glass transition temperature.

SUMMARY OF THE INVENTION

A subject of the invention is thus a thermoplastic polymer comprising:
at least one 1,4:3,6-dianhydrohexitol unit (A);
at least one alicyclic diol unit (B) other than the 1,4:3,6-dianhydrohexitol units (A);
at least one terephthalic acid unit (C);
said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g polyester/l) of said polyester is greater than 50 ml/g.

Despite the fact that it may comprise large amounts of 1,4:3,6-dianhydrohexitol units known as agents which generate coloration in polyesters during polymerization, the Applicant was able to observe that the polyesters according to the invention could surprisingly simultaneously exhibit high viscosity and low coloration.

This polymer may especially be obtained by a particular production process, especially comprising a step of introducing, into a reactor, monomers comprising at least one 1,4:3,6-dianhydrohexitol (A), at least one alicyclic diol (B) other than the 1,4:3,6-dianhydrohexitols (A) and at least one terephthalic acid (C), said monomers not containing any aliphatic non-cyclic diols or comprising a molar amount of aliphatic non-cyclic diol units of less than 5%, this amount being determined relative to all the monomers introduced.

This process comprises a step of polymerization, at a high temperature, of said monomers to form the polyester, said step consisting of:
a first stage of oligomerization, during which the reaction medium is stirred under an inert atmosphere at a temperature ranging from 265 to 280° C., advantageously from 270 to 280° C., for example 275° C.;
a second stage of condensation of the oligomers, during which the oligomers formed are stirred under vacuum, at a temperature ranging from 278 to 300° C. so as to form the polyester, advantageously from 280 to 290° C., for example 285° C.;
a step of recovering the polyester;
in which the molar ratio ((A)+(B))/(C) ranges from 1.05 to 1.5.

The Applicant observed that, by using a terephthalic acid as monomer (C), very specific selected amounts of (A), (B) and (C) and high temperatures during polymerization (oligomerization and condensation of the oligomers), it is entirely possible to obtain novel polyesters having a higher viscosity. Contrary to what was believed by those skilled in the art, the 1.4:3,6-dianhydrohexitols (and in particular isosorbide) as the only diols are not responsible for the coloration of the polyesters during the polymerization, despite the high temperatures used during the process. The Applicant has surprisingly found that the polyesters only become colored if the diols used are mixtures of 1.4:3,6-dianhydrohexitols with aliphatic non-cyclic diols, and in particular when the molar amount of aliphatic non-cyclic diols is equal to or exceeds 5%. Without being bound by a particular theory, it appears that the degradation of 1,4:3,6-dianhydrohexitols is increased during polymerization when aliphatic non-cyclic diols are included in the starting monomers. This could be explained by the fact that these aliphatic non-cyclic diols polymerize rapidly with terephthalic acid, which would slow down the polymerization of the 1,4:3,6-dianhydrohexitols with the terephthalic acid; the 1.4:3,6-dianhydrohexitols would then be subjected to high temperatures for a longer period, which would induce a phenomenon of high coloration of the polyester and a reduction in the viscosity of the polyester formed.

The polyester according to the invention has a high reduced viscosity in solution and can be used in many plastics transformation tools, and especially be easily transformed by blow molding. It also has excellent impact strength properties. According to certain embodiments of the invention, they may also have particularly high glass transition temperatures.

Another subject of the invention is various processes for producing this polyester.

DETAILED DESCRIPTION OF THE INVENTION

The polymer which is a subject of the invention is a thermoplastic polyester comprising:
- at least one 1,4:3,6-dianhydrohexitol unit (A);
- at least one alicyclic diol unit (B) other than the 1,4:3,6-dianhydrohexitol units (A);
- at least one terephthalic acid unit (C).

The polyester according to the invention does not contain any aliphatic non-cyclic diol units, or comprises a small amount thereof.

"Low molar amount of aliphatic non-cyclic diol units" is intended to mean, especially, a molar amount of aliphatic non-cyclic diol units of less than 5%. According to the invention, this molar amount represents the ratio of the sum of the aliphatic non-cyclic diol units, these units possibly being identical or different, relative to all the monomer units of the polyester.

An aliphatic non-cyclic diol may be a linear or branched aliphatic non-cyclic diol. It may also be a saturated or unsaturated aliphatic non-cyclic diol. Aside from ethylene glycol, the saturated linear aliphatic non-cyclic diol may for example be 1,3-propanediol, 1,4-butanediol, 1,5-pentanediol, 1,6-hexanediol, 1,8-octanediol and/or 1,10-decanediol. As examples of saturated branched aliphatic non-cyclic diol, mention may be made of 2-methyl-1,3-propanediol, 2,2,4-trimethyl-1,3-pentanediol, 2-ethyl-2-butyl-1,3-propanediol, propylene glycol and/or neopentyl glycol. As an example of an unsaturated aliphatic non-cyclic diol, mention may be made, for example, of cis-2-butene-1,4-diol.

This molar amount of aliphatic non-cyclic diol units is advantageously less than 1%. Preferably, the polyester does not contain any aliphatic non-cyclic diol units.

Despite the small amount of aliphatic non-cyclic diol, and hence ethylene glycol, used for producing the polyester, the polyester has a high reduced viscosity in solution.

This high reduced viscosity in solution enables the polyester to be able to be used in numerous applications described below.

This reduced viscosity in solution may be greater than 50 ml/g, this viscosity being able to be measured using an Ubbelohde capillary viscosimeter at 25° C. in an equi-mass mixture of phenol and ortho-dichlorobenzene after dissolving the polymer at 130° C. with stirring, the concentration of polymer introduced being 5 g/l.

This test for measuring reduced viscosity in solution is, due to the choice of solvents and the concentration of the polymers used, perfectly suited to determining the viscosity of the viscous polymer of the present invention. According to the present invention, a polyester of reduced viscosity in solution of greater than 50 ml/g and extending up to 70 ml/g is considered to be a "high-viscosity polyester".

The Applicant has also succeeded in obtaining a polyester having an even higher viscosity, hereinafter referred to as "very high-viscosity polyester". "Very high-viscosity polyester" is intended to mean, according to the invention, a polyester having a reduced viscosity in solution of greater than 70 ml/g, advantageously greater than 75 ml/g, preferably greater than 85 ml/g, most preferentially greater than 95 ml/g.

In the case where the polyester according to the invention is a very high-viscosity polyester, it has excellent impact strength properties at room temperature but also good cold impact strength properties. Since this polyester can be used and mechanically stressed at low temperature, this enables it to be used in numerous applications, in various industries such as, for example, the automotive or household appliance industries.

The monomer (A) is a 1,4:3,6-dianhydrohexitol. As explained previously, 1,4:3,6-dianhydrohexitols have the drawback of being secondary diols which are not very reactive in the production of polyesters. The 1,4:3,6-dianhydrohexitol (A) may be isosorbide, isomannide, isoidide, or a mixture thereof. Preferably, the 1,4:3,6-dianhydrohexitol (A) is isosorbide.

Isosorbide, isomannide and isoidide may be obtained, respectively, by dehydration of sorbitol, of mannitol and of iditol. As regards isosorbide, it is sold by the Applicant under the brand name Polysorb® P.

The alicyclic diol (B) is also referred to as aliphatic cyclic diol. It is a diol which may especially be chosen from 1,4-cyclohexanedimethanol, 1,2-cyclohexanedimethanol, 1,3-cyclohexanedimethanol or a mixture of these diols. The alicyclic diol (B) is very preferentially 1,4-cyclohexanedimethanol. The alicyclic diol (B) may be in the cis configuration, in the trans configuration, or may be a mixture of diols in the cis and trans configurations.

The polyester of the invention may for example comprise:
- a molar amount of 1,4:3,6-dianhydrohexitol units (A) ranging from 1 to 54%;
- a molar amount of alicyclic diol units (B) other than the 1,4:3,6-dianhydrohexitol units (A) ranging from 1 to 54%;
- a molar amount of terephthalic acid units (C) ranging from 45 to 55%.

The amounts of different units in the polyester may be determined by $^1$H NMR or by chromatographic analysis of the mixture of monomers resulting from complete hydrolysis or methanolysis of the polyester, preferably by $^1$H NMR.

Those skilled in the art can easily find the analysis conditions for determining the amounts of each of the units of the polyester. For example, from an NMR spectrum of a poly(1,4-cyclohexanedimethylene-co-isosorbide terephthalate), the chemical shifts relating to the 1,4-cyclohexanedimethanol are between 0.9 and 2.4 ppm and 4.0 and 4.5 ppm, the chemical shifts relating to the terephthalate ring are between 7.8 and 8.4 ppm and the chemical shifts relating to the isosorbide are between 4.1 and 5.8 ppm. The integration of each signal makes it possible to determine the amount of each unit of the polyester.

The polyester according to the invention may be semi-crystalline or amorphous. The semi-crystalline character of the polymer depends primarily on the amounts of each of the units in the polymer. Thus, when the polymer according to the invention comprises large amounts of 1,4:3,6-dianhydrohexitol units (A), the polymer is generally amorphous, whereas it is generally semi-crystalline in the opposite case.

Preferably, the polyester according to the invention has a glass transition temperature ranging from 85 to 200° C.

According to one advantageous embodiment, the polyester according to the invention comprises:
- a molar amount of 1,4:3,6-dianhydrohexitol units (A) ranging from 1 to 20%, advantageously from 5 to 15%;
- a molar amount of alicyclic diol units (B) other than the 1,4:3,6-dianhydrohexitol units (A) ranging from 25 to 54%, advantageously from 30 to 50%;
- a molar amount of terephthalic acid units (C) ranging from 45 to 55%.

According to this advantageous embodiment, the polyester is generally semi-crystalline. The Applicant has succeeded in obtaining polyesters having semi-crystalline properties, even when the molar amount of 1,4:3,6-dianhydrohexitols reaches 20%. This polyester surprisingly exhibits excellent impact strength properties. Moreover, the crystallization rate of these novel polyesters is greater than that of PEITs and PEICTs, which makes it possible to transform them into articles having improved application properties. In particular, this semi-crystalline polyester has a particularly high thermomechanical strength, due to its high glass transition temperature and the presence of crystallinity which reinforces the mechanical properties at high temperature.

Preferably, when the polyester according to the invention is semi-crystalline, it has a melting point ranging from 210 to 295° C., for example from 240 to 285° C.

Preferably, when the polyester according to the invention is semi-crystalline, it has a glass transition temperature ranging from 85 to 140° C., for example from 90 to 115° C.

The glass transition temperatures and melting points are measured by conventional methods, especially using differential scanning calorimetry (DSC) using a heating rate of 10° C./min. The experimental protocol is described in detail in the example section below.

Advantageously, when the polyester according to the invention is semi-crystalline, it has a heat of fusion of greater than 10 J/g, preferably greater than 30 J/g, the measurement of this heat of fusion consisting in subjecting a sample of this polyester to a heat treatment at 170° C. for 10 hours, then in evaluating the heat of fusion by DSC by heating the sample at 10° C./min.

According to another embodiment of the invention, the polyester comprises:
- a molar amount of 1,4:3,6-dianhydrohexitol units (A) ranging from 20 to 54%;
- a molar amount of alicyclic diol units (B) other than the 1,4:3,6-dianhydrohexitol units (A) ranging from 1 to 35%;
- a molar amount of terephthalic acid units (C) ranging from 45 to 55%.

According to this other embodiment, the polymer is generally amorphous.

Preferably, when the polyester according to the invention is amorphous, it has a glass transition temperature ranging from 120 to 200° C., for example from 140 to 190° C.

The polyester according to the invention may have low coloration and especially have a lightness L* greater than 50. Advantageously, the lightness L* is greater than 55, preferably greater than 60, most preferentially greater than 65, for example greater than 70.

The parameters L* may be determined using a spectrophotometer, via the CIE Lab model.

The polyester according to the invention, especially that of very high viscosity, has a very good impact strength, in particular a very good cold impact strength.

The polyester according to the invention, especially that of very high viscosity, advantageously has a non-notched Charpy impact strength greater than 100 kJ/m$^2$ (25° C., ISO 179-1/1eU: 2010).

The polyester according to the invention, especially that of very high viscosity, advantageously has a notched Charpy impact strength greater than 5 kJ/m$^2$, advantageously greater than 10 kJ/m$^2$ (−30° C., ISO 179-1/1eA: 2010).

These very high impact strength properties were able to be obtained even when the polyester according to the invention is semi-crystalline. This goes against the teaching of application US2012/0177854, which teaches decreasing the crystallinity of the polyester with a view to improving the impact strength properties thereof.

Another subject of the invention is a process for producing the polyester according to the invention.

According to a first variant of the process of the invention, the Applicant has succeeded in obtaining a polyester, which may have a high reduced viscosity in solution, by a production process comprising:
- a step of introducing, into a reactor, monomers comprising at least one 1,4:3,6-dianhydrohexitol (A), at least one alicyclic diol (B) other than the 1,4:3,6-dianhydrohexitols (A) and at least one terephthalic acid (C), the molar ratio ((A)+(B))/(C) ranging from 1.05 to 1.5, said monomers not containing any aliphatic non-cyclic diols or comprising, relative to all of the monomers introduced, a molar amount of aliphatic non-cyclic diol units of less than 5%;
- a step of introducing, into the reactor, a catalytic system;
- a step of polymerizing said monomers to form the polyester, said step consisting of:
    - a first stage of oligomerization, during which the reaction medium is stirred under an inert atmosphere at a temperature ranging from 265 to 280° C., advantageously from 270 to 280° C., for example 275° C.;
    - a second stage of condensation of the oligomers, during which the oligomers formed are stirred under vacuum, at a temperature ranging from 278 to 300° C. so as to form the polyester, advantageously from 280 to 290° C., for example 285° C.;
- a step of recovering the polyester.

Thus, contrary to that which was expected due to the use of high temperatures during the stages of oligomerization and condensation of the oligomers, it is entirely possible, using the first variant of the process according to the invention, to obtain high-viscosity polyesters with low coloration. Without being bound by any theory, the Applicant explains this low coloration by the fact that it is only when large amounts of aliphatic non-cyclic diol are used in combination with 1,4:3,6-dianhydrohexitol that the latter degrades in the reactor during polymerization. Quite unexpectedly, according to the process of the invention which uses small molar amounts of aliphatic non-cyclic diol (less than 5%), or even does not use this monomer, it is entirely possible to obtain polymers simultaneously exhibiting high viscosity and low coloration.

The polymer obtained may thus at least have a reduced viscosity in solution of greater than 50 ml/g.

This first stage of this variant of the process is carried out in an inert atmosphere, that is to say under an atmosphere of at least one inert gas. This inert gas may especially be dinitrogen. This first stage can be carried out under a gas stream. It can also be carried out under pressure, for example at a pressure of between 1.05 and 8 bar.

Preferably, the pressure ranges from 3 to 8 bar, most preferentially from 5 to 7.5 bar, for example 6.6 bar. Under these preferred pressure conditions, the reaction of all the monomers with one another is promoted by limiting the loss of monomers during this stage.

Prior to the first stage of oligomerization, a step of deoxygenation of the monomers is preferentially carried out. It can be carried out for example by generating a vacuum after having introduced the monomers into the reactor and then by introducing an inert gas such as nitrogen into the reactor. This vacuum-inert gas introduction cycle can be repeated several times, for example from 3 to 5 times. Preferably, this vacuum-nitrogen cycle is carried out at a temperature of between 60 and 80° C. so that the reagents, and especially the diols, are totally molten. This deoxygenation step has the advantage of improving the coloration properties of the polyester obtained at the end of the process.

The second stage of condensation of the oligomers is carried out under vacuum. The pressure may decrease continuously during this second stage by using pressure decrease ramps, in steps, or else using a combination of pressure decrease ramps and steps. Preferably, at the end of this second stage, the pressure is less than 10 mbar, most preferentially less than 1 mbar.

According to this first variant of the process, the first stage of the polymerization step preferably has a duration ranging from 20 minutes to 5 hours. Advantageously, the second stage has a duration ranging from 30 minutes to 6 hours, the beginning of this stage being the moment at which the reactor is placed under vacuum, that is to say at a pressure of less than 1 bar.

The process of this first variant comprises a step of introducing a catalytic system into the reactor. This step may take place beforehand or during the polymerization step described above.

Catalytic system is intended to mean a catalyst or a mixture of catalysts, optionally dispersed or fixed on an inert support.

The catalyst is used in amounts suitable for obtaining a high-viscosity polymer in accordance with the invention.

An esterification catalyst is advantageously used during the oligomerization stage. This esterification catalyst can be chosen from tin derivatives, titanium derivatives, zirconium derivatives, hafnium derivatives, zinc derivatives, manganese derivatives, calcium derivatives and strontium derivatives, organic catalysts such as para-toluenesulfonic acid (PTSA) or methanesulfonic acid (MSA), or a mixture of these catalysts. By way of example of such compounds, mention may be made of those given in application US 2011282020A1 in paragraphs [0026] to [0029], and on page 5 of application WO 2013/062408 A1.

Preferably, a titanium derivative, a zinc derivative or a manganese derivative is used during the first stage of transesterification.

By way of example of amounts by weight, use may be made of from 10 to 500 ppm of catalytic system during the oligomerization stage, relative to the amount of monomers introduced.

At the end of transesterification, the catalyst from the first step can be optionally blocked by adding phosphorous acid or phosphoric acid, or else, as in the case of tin(IV), reduced with phosphites such as triphenyl phosphite or tris(nonylphenyl)phosphites or those cited in paragraph [0034] of application US 2011 282020A1.

The second stage of condensation of the oligomers may optionally be carried out with the addition of a catalyst. This catalyst is advantageously chosen from tin derivatives, preferentially derivatives of tin, titanium, zirconium, germanium, antimony, bismuth, hafnium, magnesium, cerium, zinc, cobalt, iron, manganese, calcium, strontium, sodium, potassium, aluminum or lithium, or of a mixture of these catalysts. Examples of such compounds may for example be those given in patent EP 1 882 712 B1 in paragraphs [0090] to [0094].

Preferably, the catalyst is a tin, titanium, germanium, aluminum or antimony derivative.

By way of example of amounts by weight, use may be made of from 10 to 500 ppm of catalytic system during the stage of condensation of the oligomers, relative to the amount of monomers introduced.

Preferably, a catalytic system is used during the first stage and the second stage of polymerization. Said system advantageously consists of a catalyst based on tin or of a mixture of catalysts based on tin, titanium, germanium and aluminum.

By way of example, use may be made of an amount by weight of 10 to 500 ppm of catalytic system relative to the amount of monomers introduced.

According to the process of the first variant, an antioxidant is advantageously used during the step of polymerization of the monomers. These antioxidants make it possible to reduce the coloration of the polyester obtained. The antioxidants may be primary and/or secondary antioxidants. The primary antioxidant may be a sterically hindered phenol, such as the compounds Hostanox® 0 3, Hostanox® 0 10, Hostanox® 0 16, Ultranox® 210, Ultranox® 276, Dovernox® 10, Dovernox® 76, Dovernox® 3114, Irganox® 1010 or Irganox® 1076 or a phosphonate such as Irgamod® 195. The secondary antioxidant may be trivalent phosphorus compounds such as Ultranox® 626, Doverphos® S-9228, Hostanox® P-EPQ or Irgafos 168.

It is also possible to introduce as polymerization additive into the reactor at least one compound that is capable of limiting spurious etherification reactions, such as sodium acetate, tetramethylammonium hydroxide or tetraethylammonium hydroxide.

The process of the first variant comprises a step of recovering the polyester at the end of the polymerization step. The polyester can be recovered by extracting it from the reactor in the form of a molten polymer rod. This rod can be converted into granules using conventional granulation techniques.

The polyester thus recovered has a reduced viscosity in solution of greater than 50 ml/g and generally less than 70 ml/g.

According to a second variant of the process of the invention, the process for producing the polyester comprises a step of increasing the molar mass by post-polymerization of a polymer of lower reduced viscosity in solution, which comprises at least one 1,4:3,6-dianhydrohexitol unit (A), at least one alicyclic diol unit (B) other than the 1,4:3,6-dianhydrohexitol units (A) and at least one terephthalic acid unit (C), said polymer of lower reduced viscosity in solution not containing any aliphatic non-cyclic diol units or comprising a molar amount of aliphatic non-cyclic diol units, relative to all of the monomer units of the polymer, of less than 5%.

According to this second advantageous variant of the invention, it is possible to obtain a polyester having a particularly high reduced viscosity in solution, for example greater than 70 ml/g.

"Polymer of lower reduced viscosity in solution" is intended to mean a polyester having a reduced viscosity in solution which is lower than that of the polyester obtained at the end of the post-polymerization step. This polymer can be obtained according to the methods described in the documents US2012/0177854 and Yoon et al., using production processes using diols and diesters of terephthalic acid as monomers, or using the process of the first variant described above.

The post-polymerization step may consist of a step of solid-state polycondensation (SSP) of the polymer of lower reduced viscosity in solution or of a step of reactive extrusion of the polymer of lower reduced viscosity in solution in the presence of at least one chain extender.

According to a first particularly preferred embodiment of this second variant of the process, this post-polymerization step is carried out by SSP.

SSP is generally carried out at a temperature between the glass transition temperature and the melting point of the polymer. Thus, in order to carry out the SSP, it is necessary that the polymer of lower reduced viscosity in solution is semi-crystalline. Preferably the latter has a heat of fusion of greater than 10 J/g, preferably greater than 30 J/g, the measurement of this heat of fusion consisting in subjecting a sample of this polymer of lower reduced viscosity in solution to a heat treatment at 170° C. for 10 hours, then in evaluating the heat of fusion by DSC by heating the sample at 10 K/min.

Preferably, the polymer of lower reduced viscosity in solution comprises:
  a molar amount of 1,4:3,6-dianhydrohexitol units (A) ranging from 1 to 20%, advantageously from 5 to 15%;
  a molar amount of alicyclic diol units (B) other than the 1,4:3,6-dianhydrohexitol units (A) ranging from 25 to 54%, advantageously from 30 to 50%;
  a molar amount of terephthalic acid units (C) ranging from 45 to 55%.

Advantageously, according to this embodiment of the process, the SSP step is carried out at a temperature ranging from 190 to 300° C., preferably from 200 to 280° C.

The SSP step may be carried out in an inert atmosphere, for example under nitrogen or under argon or under vacuum.

According to a second embodiment of the process of the invention, the post-polymerization step is carried out by reactive extrusion of the polymer of lower reduced viscosity in solution in the presence of at least one chain extender.

The chain extender is a compound comprising two functions capable of reacting, in reactive extrusion, with alcohol, carboxylic acid and/or carboxylic acid ester functions of the polymer of lower reduced viscosity in solution. The chain extender may, for example, be chosen from compounds comprising two isocyanate, isocyanurate, lactam, lactone, carbonate, epoxy, oxazoline and imide functions, it being possible for said functions to be identical or different.

The reactive extrusion may be carried out in an extruder of any type, especially a single-screw extruder, a co-rotating twin-screw extruder or a counter-rotating twin-screw extruder. However, it is preferred to carry out this reactive extrusion using a co-rotating extruder.

The reactive extrusion step may be carried out by:
  introducing the polymer of lower reduced viscosity in solution into the extruder so as to melt said polymer;
  then introducing the chain extender into the molten polymer;
  then reacting the polymer with the chain extender in the extruder;
  then recovering the polyester obtained in the extrusion step.

During extrusion, the temperature inside the extruder is regulated so as to be at a temperature above the glass transition temperature if the polymer is amorphous and above the melting point if the polymer is semi-crystalline. The temperature inside the extruder may range from 150 to 320° C.

The invention also relates to the polyester able to be obtained by the process of the invention.

The invention also relates to a composition comprising the polyester according to the invention, this composition possibly comprising at least one additive or at least one additional polymer or at least one mixture thereof.

The polyester composition according to the invention may comprise the polymerization additives optionally used during the process. It may also comprise other additives and/or additional polymers that are generally added during a subsequent thermomechanical mixing step.

By way of examples of additives, mention may be made of fillers or fibers of organic or mineral, nanometric or non-nanometric, functionalized or non-functionalized nature. They may be silicas, zeolites, glass fibers or beads, clays, mica, titanates, silicates, graphite, calcium carbonate, carbon nanotubes, wood fibers, carbon fibers, polymer fibers, proteins, cellulose-based fibers, lignocellulosic fibers and non-destructured granular starch. These fillers or fibers can make it possible to improve the hardness, the rigidity or the water- or gas-permeability. The composition may comprise from 0.1% to 75% by weight of fillers and/or fibers relative to the total weight of the composition, for example from 0.5% to 50%. The additive that is of use in the composition according to the invention may also comprise opacifiers, dyes and pigments. They may be chosen from cobalt acetate and the following compounds: HS-325 Sandoplast® Red BB (which is a compound bearing an azo function, also known under the name Solvent Red 195), HS-510 Sandoplast® Blue 2B which is an anthraquinone, Polysynthren® Blue R, and Clariant® RSB Violet.

The composition may also comprise, as additive, a processing aid, for reducing the pressure in the processing tool. A demolding agent which makes it possible to reduce the adhesion to the materials for forming the polyester, such as the molds or the calendering rollers, may also be used. These aids may be chosen from fatty acid esters and fatty acid amides, metal salts, soaps, paraffins and hydrocarbon-based waxes. Particular examples of these agents are zinc stearate, calcium stearate, aluminum stearate, stearamides, erucamides, behenamides, beeswaxes or candelilla wax.

The composition according to the invention may also comprise other additives, such as stabilizers, for example light stabilizers, UV stabilizers and heat stabilizers, fluidizers, flame retardants and antistatic agents.

The composition may also comprise an additional polymer other than the polyester according to the invention. This polymer may be chosen from polyamides, polyesters other than the polyester according to the invention, polystyrene, styrene copolymers, styrene-acrylonitrile copolymers, styrene-acrylonitrile-butadiene copolymers, poly(methyl methacrylate)s, acrylic copolymers, poly(ether-imide)s, poly(phenylene oxide)s, such as poly(2,6-dimethylphenylene oxide), poly(phenylene sulfate)s, poly(ester-carbonate)s, polycarbonates, polysulfones, polysulfone ethers, polyether ketones, and mixtures of these polymers.

The composition may also comprise, as additional polymer, a polymer which makes it possible to improve the impact properties of the polymer, especially functional polyolefins such as functionalized ethylene or propylene polymers and copolymers, core-shell copolymers or block copolymers.

The composition according to the invention may also comprise polymers of natural origin, such as starch, cellulose, chitosans, alginates, proteins such as gluten, pea proteins, casein, collagen, gelatin or lignin, these polymers of natural origin possibly being physically or chemically modified.

The starch may be used in destructured or plasticized form. In the latter case, the plasticizer may be water or a polyol, especially glycerol, polyglycerol, isosorbide, sorbitans, sorbitol, mannitol or else urea. The process described in document WO 2010/010 282 A1 may especially be used to prepare the composition.

The composition according to the invention may be produced by conventional thermoplastics mixing methods. These conventional methods comprise at least one step of mixing the polymers in the molten or softened state and a step of recovering the composition. This process may be performed in paddle or rotor internal mixers, external mixers, or single-screw or twin-screw co-rotating or counter-rotating extruders. However, it is preferred to produce this mixture by extrusion, especially using a co-rotating extruder.

The mixing of the constituents of the composition may take place under an inert atmosphere.

In the case of an extruder, the various constituents of the composition may be introduced by means of feed hoppers located along the extruder.

The invention also relates to a plastic, finished or semi-finished article comprising the polyester or the composition according to the invention.

This article may be of any type and may be obtained using conventional transformation techniques.

It may be, for example, fibers or threads that are of use in the textile industry or other industries. These fibers or threads may be woven so as to form fabrics, or else nonwovens.

The article according to the invention may also be a film or a sheet. These films or sheets may be manufactured by the techniques of calendering, extrusion film cast, extrusion film blowing, followed or not by monoaxial or polyaxial stretching or orientation techniques. These sheets may be thermoformed or injected to be used, for example, for parts such as the viewing windows or covers for machines, the body of various electronic devices (telephones, computers, screens) or else as impact-resistant windows.

The article may also be transformed also be processed by extrusion of profiled elements which may have applications in the building and construction sectors.

The article according to the invention may also be a container for transporting gases, liquids and/or solids. The containers concerned may be baby bottles, flasks, bottles, for example sparkling or still water bottles, juice bottles, soda bottles, carboys, alcoholic drink bottles, small bottles, for example small medicine bottles, small bottles for cosmetic products, these small bottles possibly being aerosols, dishes, for example for ready meals, microwave dishes, or else lids. These containers may be of any size. They may be produced by extrusion blow molding, thermoforming or injection blow molding.

These articles may also be optical articles, i.e. articles requiring good optical properties, such as lenses, disks, transparent or translucent panels, light-emitting diode (LED) components, optical fibers, films for LCD screens or else windows. These optical articles have the advantage of being able to be placed close to light sources and therefore to heat sources, while retaining excellent dimensional stability and good resistance to light.

Among the applications of the article, mention may also be made of parts with a protective aim where impact strength is important, such as cell phone protectors, spherical packaging, but also, in the automotive sector, bumpers and dashboard elements.

The articles may also be multilayer articles, at least one layer of which comprises the polymer or the composition according to the invention. These articles may be produced via a process comprising a coextrusion step in the case where the materials of the various layers are placed in contact in the molten state. By way of example, mention may be made of the techniques of tube coextrusion, profile coextrusion, coextrusion blow molding of a bottle, a small bottle or a tank, generally collated under the term "coextrusion blow molding of hollow bodies", coextrusion blow molding, also known as film blowing, and cast coextrusion.

They may also be produced according to a process comprising a step of applying a layer of molten polyester onto a layer based on organic polymer, metal or adhesive composition in the solid state. This step may be performed by pressing, by overmolding, stratification or lamination, extrusion-lamination, coating, extrusion-coating or spreading.

The invention will now be illustrated in the examples below. It is specified that these examples do not in any way limit the present invention.

EXAMPLES

The properties of the polymers were studied via the following techniques:

The reduced viscosity in solution is evaluated using an Ubbelohde capillary viscometer at 25° C. in an equi-mass mixture of phenol and ortho-dichlorobenzene after dissolving the polymer at 130° C. with magnetic stirring. For these measurements, the polymer concentration introduced is 5 g/l.

The color of the polymer was measured on the granules (25 grams of granules in the measuring cell) using a Konica Minolta CM-2300d spectrophotometer.

The mechanical properties of the polymers were evaluated according to the following standards:
Bending test: ISO 178
Tensile test: ISO 527
Charpy impact test: ISO 179-1: 2010 (non-notched: ISO 179-1/1eU, notched: EN ISO 179-1/1eA)
The impact strengths were determined as follows:
 in a first step, the test according to standard ISO 179-1 1eU is carried out at 25° C.;
 if, during this first test, the strength is greater than 155 kJ/m$^2$, the ISO 179-1/1eA test is carried out at 25° C.;
 if, during this second test, the strength is greater than 155 kJ/m$^2$, the ISO 179-1/1eA test is carried out at −30° C.
HDT test, Method B, stress 0.45 MPa ISO 75
Vicat Method B50 ISO 306
DSC The thermal properties of the polyesters were measured by differential scanning calorimetry (DSC): The sample is first heated under a nitrogen atmosphere in an open crucible from 10° C. to 320° C. (10° C. min$^{-1}$), cooled to 10° C. (10° C. min$^{-1}$), then heated again to 320° C. under the same conditions as the first step. The glass transition temperatures were taken at the mid-point of the second heating. Any melting points are determined on the endothermic peak (onset) at the first heating. Similarly, the enthalpy of fusion (area under the curve) is determined at the first heating.

For the illustrative examples presented below, the following reagents were used:
Ethylene glycol (purity>99.8%) from Sigma-Aldrich
1,4-Cyclohexanedimethanol (99% purity, mixture of cis and trans isomers)
Isosorbide (purity>99.5%) Polysorb® P from Roquette Freres
Terephthalic acid (99+% purity) from Acros
Germanium dioxide (>99.99%) from Sigma-Aldrich
Irgamod 1010 from BASF AG
Dibutyltin oxide (98% purity) from Sigma-Aldrich
Carbonylbiscaprolactam (Allinco CBC) from DSM.
Tritan TX2001: performance copolyester sold by Eastman®

Preparation of the Polyesters

Example 1

1680 g (11.6 mol) of 1,4-cyclohexanedimethanol, 233 g (1.6 mol) of isosorbide, 2000 g (12.0 mol) of terephthalic acid, 1.65 g of Irganox 1010 (antioxidant) and 1.39 g of dibutyltin oxide (catalyst) are added to a 7.5 l reactor. To extract the residual oxygen from the isosorbide crystals, four vacuum-nitrogen cycles are performed once the temperature of the reaction medium is between 60 and 80° C. The reaction mixture is then heated to 275° C. (4° C./min) under 6.6 bar of pressure and with constant stirring (150 rpm). The degree of esterification is estimated from the amount of distillate collected. The pressure is then reduced to 0.7 mbar over 90 minutes following a logarithmic ramp and the temperature is brought to 285° C. These vacuum and temperature conditions were maintained until an increase in torque of 15 Nm relative to the initial torque was obtained. Finally, a polymer rod is cast via the bottom valve of the reactor, cooled to 15° C. in a heat-regulated water bath and chopped in the form of granules of about 15 mg.

The resin thus obtained has a reduced viscosity in solution of 69.9 ml/g$^{-1}$. $^1$H NMR analysis of the polyester shows that the final polyester contains 3.2 mol % of isosorbide relative to all the monomer units. With regard to the thermal properties (measured at the second heating), the polymer has a glass transition temperature of 91° C., a melting point of 276° C. with an enthalpy of fusion of 44.5 J/g. The mechanical properties of the polymer obtained are summarized in Table 1. The lightness L * is 53.2.

Example 1a

The polyester from Example 1 is used in a solid-state post-condensation step. First, the polymer is crystallized for 2 h in an oven under vacuum at 170° C. The crystallized polymer is then introduced into an oil bath rotavap fitted with a cannulated flask. The granules are then subjected to a temperature of 248° C. and a nitrogen flow of 3.3 l/min.

After 23 h the polymer reaches a reduced viscosity in solution of 106.5 ml/g. Finally, after 54 h of post-condensation, the polymer will have a viscosity in solution of 121.3 ml/g. The mechanical properties of the polymer obtained are summarized in Table 1.

Example 1 b

According to another process according to the invention, the polymer of Ex. 1 was extruded in a DSM twin-screw microextruder in the presence of 1 w % carbonylbiscaprolactam (Allinco CBC). The extrusion was carried out on 12 g of polymer for 2 min at 300° C. The polymer has a viscosity in solution of 85.5 ml/g.

Example 2

1432 g (9.9 mol) of 1,4-cyclohexanedimethanol, 484 g (3.3 mol) of isosorbide, 2000 g (12.0 mol) of terephthalic acid, 1.65 g of Irganox 1010 (antioxidant) and 1.39 g of dibutyltin oxide (catalyst) are added to a 7.5 l reactor. To extract the residual oxygen from the isosorbide crystals, four vacuum-nitrogen cycles are performed once the temperature of the reaction medium is between 60 and 80° C. The reaction mixture is then heated to 275° C. (4° C./min) under 6.6 bar of pressure and with constant stirring (150 rpm). The degree of esterification is estimated from the amount of distillate collected. The pressure is then reduced to 0.7 mbar over 90 minutes following a logarithmic ramp and the temperature is brought to 285° C. These vacuum and temperature conditions were maintained until an increase in torque of 12.1 Nm relative to the initial torque was obtained. Finally, a polymer rod is cast via the bottom valve of the reactor, cooled to 15° C. in a heat-regulated water bath and chopped in the form of granules of about 15 mg.

The resin thus obtained has a reduced viscosity in solution of 80.1 ml/g$^{-1}$. $^1$H NMR analysis of the polyester shows that the final polyester contains 8.5 mol % of isosorbide relative to all the monomer units. With regard to the thermal properties, the polymer has a glass transition temperature of 96° C., a melting point of 253° C. with an enthalpy of fusion of 23.2 J/g. The lightness L * is 55.3.

Example 2a

The polyester from Example 2 is used in a solid-state post-condensation step. First, the polymer is crystallized for 2 h in an oven under vacuum at 170° C. The crystallized polymer is then introduced into an oil bath rotavap fitted with a cannulated flask. The granules are then subjected to a temperature of 230° C. and a nitrogen flow of 3.3 l/min.

After 31 h of post-condensation, the polymer will have a viscosity in solution of 118.3 ml/g. The mechanical properties of the polymer obtained are summarized in Table 1.

Example 2b

According to another process according to the invention, the polymer of Ex. 2 was extruded in a DSM twin-screw microextruder in the presence of 1 w % carbonylbiscaprolactam (Allinco CBC). The extrusion was carried out on 12 g of polymer for 2 min at 300° C. The polymer has a viscosity in solution of 92.8 ml/g.

Example 3

1194 g (8.3 mol) of 1,4-cyclohexanedimethanol, 726 g (5.0 mol) of isosorbide, 2000 g (12.0 mol) of terephthalic acid, 1.65 g of Irganox 1010 (antioxidant) and 1.39 g of dibutyltin oxide (catalyst) are added to a 7.5 l reactor. To extract the residual oxygen from the isosorbide crystals, four vacuum-nitrogen cycles are performed once the temperature of the reaction medium is between 60 and 80° C. The reaction mixture is then heated to 275° C. (4° C./min) under 6.6 bar of pressure and with constant stirring (150 rpm). The degree of esterification is estimated from the amount of distillate collected. The pressure is then reduced to 0.7 mbar over 90 minutes following a logarithmic ramp and the temperature is brought to 285° C. These vacuum and temperature conditions were maintained until an increase in torque of 11.1 Nm relative to the initial torque was obtained. Finally, a polymer rod is cast via the bottom valve of the reactor, cooled to 15° C. in a heat-regulated water bath and chopped in the form of granules of about 15 mg.

The resin thus obtained has a reduced viscosity in solution of 66.2 ml/g$^{-1}$. $^1$H NMR analysis of the polyester shows that the final polyester contains 15.1 mol % of isosorbide relative to all the monomer units. With regard to the thermal properties (measured at the second heating), the polymer has a glass transition temperature of 109° C. The lightness L* is 51.5.

Example 3a

The polyester from Example 3 is used in a solid-state post-condensation step. First, the polymer is crystallized for 8 h 30 in an oven under vacuum at 170° C. The crystallized polymer is then introduced into an oil bath rotavap fitted with a cannulated flask. The granules are then subjected to a temperature of 210° C. and a nitrogen flow of 3.3 l/min.

After 33 h of post-condensation, the polymer will have a viscosity in solution of 94.2 ml/g. The mechanical properties of the polymer obtained are summarized in Table 1.

Example 3b

According to another process according to the invention, the polymer of Ex. 2 was extruded in a DSM twin-screw microextruder in the presence of 1 w % carbonylbiscaprolactam (Allinco CBC). The extrusion was carried out on 12 g of polymer for 2 min at 300° C. The polymer has a viscosity in solution of 85.4 ml/g.

Counter-example 1

This example was carried out according to the embodiment recommended by patent application US 2012/0177854 A1.

3038 g (21.0 mol) of 1,4-cyclohexanedimethanol, 440 g (3.0 mol) of isosorbide, 2000 g (12.0 mol) of terephthalic acid, and 0.38 g of germanium dioxide are added to a 7.5 l reactor. To extract the residual oxygen from the isosorbide crystals, four vacuum-nitrogen cycles are performed once the temperature of the reaction medium is between 60 and 80° C. The reaction mixture is then heated to 250° C. (4° C./min) under 6.6 bar of pressure and with constant stirring (150 rpm). The degree of esterification is estimated from the amount of distillate collected. The pressure is then reduced to 0.7 mbar over 90 minutes following a logarithmic ramp and the temperature is brought to 280° C. These vacuum and temperature conditions were maintained for 210 minutes without obtaining an increase in torque. The casting of the reactor did not make it possible to extrude a rod of polymer in order to carry out the granulation thereof.

The resin thus obtained had a reduced viscosity in solution of 16.4 ml/g$^{-1}$ under the conditions as defined in the present invention, that is to say a much lower viscosity than that of the polymer according to the invention. This polymer exhibits insufficient properties to be able to evaluate its mechanical properties.

Counter-example 2

859 g (13.8 mol) of ethylene glycol, 546 g (3.7 mol) of isosorbide, 2656 g (16.0 mol) of terephthalic acid, 1.65 g of Irganox 1010 (antioxidant) and 1.39 g of dibutyltin oxide (catalyst) are added to a 7.5 l reactor. To extract the residual oxygen from the isosorbide crystals, four vacuum-nitrogen cycles are performed once the temperature of the reaction medium is between 60 and 80° C. The reaction mixture is then heated to 275° C. (4° C./min) under 6.6 bar of pressure and with constant stirring (150 rpm). The degree of esterification is estimated from the amount of distillate collected. The pressure is then reduced to 0.7 mbar over 90 minutes following a logarithmic ramp and the temperature is brought to 285° C. These vacuum and temperature conditions were maintained until an increase in torque of 15.0 Nm relative to the initial torque was obtained. Finally, a polymer rod is cast via the bottom valve of the reactor, cooled to 15° C. in a heat-regulated water bath and chopped in the form of granules of about 15 mg.

The resin thus obtained has a reduced viscosity in solution of 58.8 ml/g$^{-1}$. $^1$H NMR analysis of the polyester shows that the final polyester contains 8.7 mol % of isosorbide relative to all the monomer units. With regard to the thermal properties (measured at the second heating), the polymer has a glass transition temperature of 97° C. The lightness L* is 46.2.

This sample does not exhibit sufficient crystallinity or a sufficient crystallization rate to allow a solid-state post-condensation step to be carried out (it has a zero heat of fusion after heat treatment for 10 hours at 170° C.).

TABLE 1

| | Mechanical properties | | | | | | | | | |
|---|---|---|---|---|---|---|---|---|---|---|
| | Impact strength (KJ/m$^2$) | | | | | | | | | |
| | Without notch at 25° C. | Notched 2 mm at 25° C. | Notched 2 mm at −30° C. | Flexural Modulus (MPa) | Traction Modulus (MPa) | Tensile strength (MPa) | Deformation at break (%) | Vicat | HDT | Shore D hardness |
| Ex1 | No breaking (>155) | 10 | NM | 1512 | 711 | 36 | 247 | 100 | 84 | 76 |
| Ex. 1a | No breaking (>155) | No breaking (>155) | 23 | 1459 | 736 | 43 | 200 | 100 | 88 | 77 |
| Ex. 2a | No breaking (>155) | No breaking (>155) | 22 | 1523 | 760 | 44 | 203 | 107 | 95 | 81 |
| Ex. 3a | No breaking (>155) | No breaking (>155) | 19 | 1608 | 798 | 40 | 164 | 115 | 103 | 81 |

TABLE 1-continued

Mechanical properties

| | Impact strength (KJ/m²) | | | Flexural Modulus (MPa) | Traction Modulus (MPa) | Tensile strength (MPa) | Deformation at break (%) | Vicat | HDT | Shore D hardness |
|---|---|---|---|---|---|---|---|---|---|---|
| | Without notch at 25° C. | Notched 2 mm at 25° C. | Notched 2 mm at −30° C. | | | | | | | |
| C-Ex. 2 | 9.6 | NM | NM | 2400 | 1110 | 39 | 4 | 96 | 86 | 81 |
| Tritan TX2001 | No breaking (>155) | 94 | NM | 1480.9 | | 44.7 | 147.4 | 117.9 | 103.8 | 79 |

Conclusions from Tests

The comparative polyester 1, which is that described in the application US 2012/0177854 A1, has a very low viscosity, in comparison with the polyester according to the invention of example 1. These two examples show that, surprisingly, it is entirely possible to form viscous polymers using the process of the first variant of the invention.

The polyesters according to the invention, produced under the same conditions as the comparative polyester of counter-example 2 (polyester further comprising a linear aliphatic diol) have lower coloration and also far superior impact strength properties.

The polyesters according to the invention have a high viscosity or even a very high viscosity when a step of increasing the molar mass by SSP or reactive extrusion is carried out.

The semi-crystalline polyesters, the molar mass of which was increased by SSP, have a higher viscosity than that of the polyesters the molar mass of which was increased by reactive extrusion, The very high-viscosity polyesters have excellent impact strength, at room temperature and in cold conditions.

The polyesters according to the invention have excellent mechanical properties, similar to the Tritan™ type performance copolyesters sold by Eastman®. Their impact strength properties are even better.

The invention claimed is:

1. A process for producing a polyester comprising:
   1,4:3,6-dianhydrohexitol units (A);
   alicyclic diol units (B) other than the 1,4:3,6-dianhydrohexitol units (A); and
   terephthalic acid units (C),
   the polyester not containing any aliphatic non-cyclic diol units or comprising less than 5 molar % of aliphatic non-cyclic diol units, relative to all the monomer units of the polyester, and the polyester having a reduced viscosity in solution (25° C.; phenol (50% m): ortho-dichlorobenzene (50% m); 5 g polyester/l) of greater than 50 ml/g, the process comprising:
   introducing, into a reactor, monomers comprising the 1,4:3,6-dianhydrohexitol (A), the alicyclic diol (B) other than the 1,4:3,6-dianhydrohexitols (A) and the terephthalic acid (C), a molar ratio ((A)+(B))/(C) ranging from 1.05 to 1.5, the monomers not containing any aliphatic non-cyclic diols or comprising, relative to all of the monomers introduced, a molar amount of aliphatic non-cyclic diol units of less than 5%;
   introducing a catalyst system into the reactor, the catalyst system comprising tin;
   after introducing the catalyst system, polymerizing the monomers in the presence of the catalyst system to form a polyester, the polymerizing comprising:
      a first stage of oligomerization carried out at a pressure of between 5 to 7.5 bar, during which a reaction medium is stirred under an inert atmosphere at a temperature in a range of 265 to 280° C.;
      a second stage of condensation of the oligomers, during which the oligomers formed are stirred under vacuum, at a temperature in a range of 278 to 300° C. so as to form the polyester; and
   recovering the polyester.

2. The process for producing the polyester according to claim 1, further comprising increasing molar mass of the polyester by post-polymerization with a polymer of lower reduced viscosity in solution comprising the 1,4:3,6-dianhydrohexitol units (A), the alicyclic diol units (B) other than the 1,4:3,6-dianhydrohexitol units (A) and the terephthalic acid units (C),
   wherein the units (A), (B) and (C) do not contain any aliphatic non-cyclic diol units or comprise a molar amount of aliphatic non-cyclic diol units, relative to all of the monomer units of the polymer, of less than 5%.

3. The process according to claim 2, wherein the post-polymerization step is carried out by solid-state polycondensation (SSP) of the polymer of lower reduced viscosity in solution.

4. The process according to claim 3, wherein the SSP is carried out at a temperature in a range of 190 to 300° C.

5. The process according to claim 2, wherein the polymer of lower reduced viscosity in solution is semi-crystalline, with a heat of fusion of greater than 10 J/g, measurement of the heat of fusion consisting of subjecting a sample of the polymer of lower reduced viscosity in solution to a heat treatment at 170° C. for 10 hours, and then evaluating the heat of fusion by DSC by heating the sample at 10 K/min.

6. The process according to claim 2, wherein the post-polymerization is carried out by reactive extrusion of the polymer of lower reduced viscosity in solution in the presence of at least one chain extender.

7. The process according to claim 6, wherein the chain extender is selected from compounds comprising two isocyanate, isocyanurate, lactam, lactone, carbonate, epoxy, oxazoline and imide functions, and the functions are identical or different.

8. The process for producing the polyester according to claim 1, wherein, in the first stage of oligomerization, the reaction medium is stirred under an inert atmosphere at a temperature in a range of 270 to 280° C.

9. The process for producing the polyester according to claim 1, wherein the polyester has a reduced viscosity in solution (25° C.; phenol (50% m): ortho-dichlorobenzene (50% m); 5 g polyester/l) of greater than 70 ml/g.

10. The process for producing the polyester according to claim 1, wherein the polyester comprises:
   a molar amount of 1,4:3,6-dianhydrohexitol units (A) ranging from 5 to 15%;
   a molar amount of alicyclic diol units (B) other than the 1,4:3,6-dianhydrohexitol units (A) ranging from 30 to 50%; and
   a molar amount of terephthalic acid units (C) ranging from 45 to 55%.

11. The process for producing the polyester according to claim 1, wherein the catalyst system comprising tin is an esterification catalyst.

12. The process for producing the polyester according to claim 1, wherein the catalyst system comprising tin is a condensation catalyst.

13. The process for producing the polyester according to claim 1, wherein the catalyst system comprising tin is dibutyltin oxide.

* * * * *